United States Patent [19]
Brichta et al.

[11] Patent Number: 5,884,310
[45] Date of Patent: *Mar. 16, 1999

[54] DISTRIBUTED DATA INTEGRATION METHOD AND SYSTEM

[75] Inventors: Harriet B. Brichta, Plano; Gerald R. Lewis, Carrollton; Mark D. Knesek, Frisco; Ronald A. Hoyt, Carrollton; Geoffrey M. Owens, Plano, all of Tex.

[73] Assignee: Electronic Data Systems Corporation, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 664,461

[22] Filed: Jun. 14, 1996

[51] Int. Cl.$^6$ .................................................. G06F 15/173
[52] U.S. Cl. ........................... 707/10; 707/4; 395/200.31
[58] Field of Search ................................. 395/604, 610, 395/200.03, 200.08, 200.09, 416, 200.31, 200.33; 707/4, 10

[56] References Cited

U.S. PATENT DOCUMENTS

| | | | |
|---|---|---|---|
| 4,714,995 | 12/1987 | Materna et al. | 364/200 |
| 5,058,000 | 10/1991 | Cox et al. | 364/200 |
| 5,335,278 | 8/1994 | Matchett et al. | 380/23 |
| 5,345,595 | 9/1994 | Johnson et al. | 455/33.1 |
| 5,416,917 | 5/1995 | Adair et al. | 395/500 |
| 5,446,880 | 8/1995 | Balgeman et al. | 395/600 |
| 5,574,904 | 11/1996 | Yunoki et al. | 395/601 |
| 5,600,833 | 2/1997 | Senn et al. | 395/601 |
| 5,625,816 | 4/1997 | Burdick et al. | 395/614 |
| 5,642,337 | 6/1997 | Oskay et al. | 369/30 |
| 5,649,168 | 7/1997 | Huang et al. | 395/500 |

OTHER PUBLICATIONS

Elmasri et al., "Fundamentals Of Database Systems", Ch6, pp. 135–165, 1989.

U.S. Patent Application Serial No. 08/528,746, filed Sep. 15, 1995, Inventor: Bowman, "System and Method for Detecting Fraudulent Network Usage Patterns Using Real–Time Network Monitoring," now U.S. patent 5,627,886.

*Primary Examiner*—Thomas G. Black
*Assistant Examiner*—Jean R. Homere
*Attorney, Agent, or Firm*—Terry J. Stalford; L. Joy Griebenow

[57] ABSTRACT

A data storage system (12) may include a plurality of source systems (14) and a common database server (16). Each source system (14) may include a source database (20), an extraction engine (24) and a transformation engine(26). At least two of the source systems (14) may have source databases (20) that store data in disparate formats and file structures. The extraction engine (24) may extract data from the source database (20). The transformation engine (26) may transform data extracted from the source database (20) into a common format and file structure. The common database server (16) may include a common database (32), a common database controller (34) and a load engine (48). The common database controller (34) may receive data transformed by the transformation engine (26). The load engine (48) may load the data received by the common database controller (34) into the common database (32).

19 Claims, 4 Drawing Sheets

| DATA RECORD I.D. | CATEGORY NAME | CATEGORY VALUE |
|---|---|---|
| 502361 | PUR GRP | NETWORK |
| 502364 | PUR GRP | NETWORK |
| 502362 | PUR GRP | COMMUNICATIONS |
| 502363 | PUR GRP | COMMUNICATIONS |
| 502361 | GLB SPND | TELECOMMUNICATIONS |
| 502362 | GLB SPND | TELECOMMUNICATIONS |
| 502363 | GLB SPND | TELECOMMUNICATIONS |
| 502364 | GLB SPND | TELECOMMUNICATIONS |
| 502361 | SPECIAL | MODEMS |

DISTRIBUTED DATA INTEGRATION METHOD AND SYSTEM

TECHNICAL FIELD-OF THE INVENTION

The present invention relates generally to the field of data manipulation and storage, and more particularly to a data storage system and method.

BACKGROUND OF THE INVENTION

Modern businesses often employ various computer systems to record information for different departments and operations. Typically, each department selects a database system that best suits its particular needs. Thus, for example, an accounting department may utilize a system designed especially for accounting tasks while a production department of the same business may utilize a system designed to fit its manufacturing needs. As a result, many businesses have data stored on a number of disparate database systems in different formats.

The lack of common functionality between database systems of a business is problematic because it does not allow data from different departments and operations to be readily integrated. Such integration is often desirable to allow managers to readily review, compare and combine data from all departments and operations of a business.

SUMMARY OF THE INVENTION

In accordance with the present invention, a data storage system and method is provided that substantially eliminates or reduces the disadvantages and problems associated with the prior systems.

The data storage system may include a plurality of source systems and a common database server. Each source system may include a source database, an extraction engine and a transformation engine. At least two of the source systems may have source databases that store data in disparate formats and file structures. The extraction engine may extract data from the source database. The transformation engine may transform data extracted from the source database into a common format and file structure. The common database server may include a common database, a common database controller and a load engine. In a particular embodiment, the common database may be a relational database. The common database controller may receive data transformed by the transformation engine. The load engine may load the data received by the common database controller into the common database.

In accordance with another aspect of the present invention, the common database may include a table having a first, second, and third column. The first column may store a plurality of data record IDs. The second column may store a category name for each data record ID. The third column may store a category value for each data record ID and category name combination.

Important technical advantages of the present invention include providing a common database and method. In particular, the invention extracts and transforms data from a variety of sources into a common format. The data may be extracted from sources that in their natural form do not relate to each other. In transforming the data, the invention may augment translation of the data with supplemental processing to facilitate consolidation. The transformed data may be loaded into a common database from which it may be accessed and manipulated by users of the system. Accordingly, the present invention integrates data from a variety of sources.

Another important technical advantage of the present invention includes providing an improved method for accommodating category schemes. In particular, database tables include columns for storing data record IDs, category names, and category values. Thus, the database table supports an unlimited number of category schemes without requiring the table to be modified or altered.

Still another important advantage of the present invention includes providing a maintenance engine that executes select long-running queries such as those that summarize large amounts of data during off-prime time cycles. The maintenance engine may also ensure that the common database remains synchronized with a user interface.

Other technical advantages will be readily apparent to those skilled in the art from the following figures, descriptions, and claims.

BRIEF DESCRIPTION OF THE DRAWINGS

For a more complete understanding of the present invention, any advantages thereof, reference is now made to the following description taken in conjunction with the accompanying drawings, in which.

DETAILED DESCRIPTION

Figure 1:
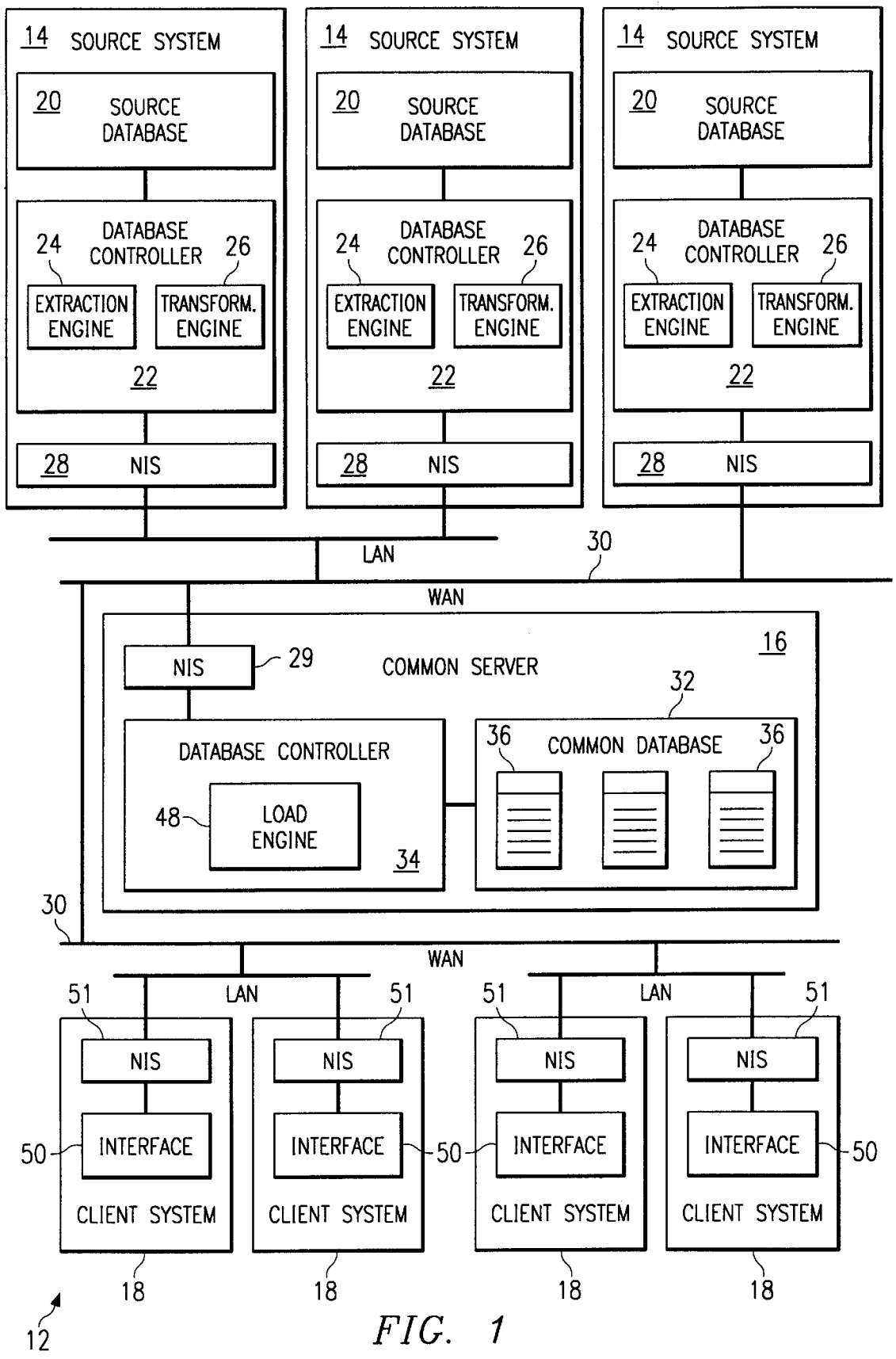
FIG. 1 illustrates a schematic block diagram of a distributed database system including a common database server in accordance with one embodiment of the present invention.

Referring now in more detail to the drawings, in which like numerals refer to like parts throughout the several views, FIG. 1 illustrates a schematic block diagram of a distributed database system 12 constructed in accordance with one embodiment of the present invention. The distributed database system 12 may comprise a plurality of source systems 14 in communication with a common server 16. The common server 16 may also be in communication with a plurality of client systems 18.

The source systems 14 may each include a source database 20 and a database controller 22. The source database 20 may consist of a number of records, each of which is constructed of fields of a particular type, together with a collection of operations that facilitate searching, sorting, recombination and similar activities.

In accordance with the present invention, the source systems 14 may include source databases 20 that store data in disparate formats and file structures. Thus, the source databases 20 may be of different types, operate on different platforms, and the like. For example, the source databases 20 may be relational, sequential and/or hierarchal databases.

Each source database 20 may record and store data pertaining to a particular department, operation or facet of a business. Traditionally, the data could only be accessed locally within the department or remotely by a similar system. Thus, a single system could not receive and integrate data from the disparate source databases 20. As described in detail below, the present invention extracts, transforms and loads data from the disparate source databases 20 into the common server 16.

The database controller 22 may manage requests for database action. The database controller 22 keeps track of the physical details of file locations and formats, indexing schemes, and the like. Additionally, the database controller 22 provides centralized control of security and data integrity requirements.

The database controller 22 may include an extraction engine 24 and a transformation engine 26. The extraction engine 24 operates in conjunction with the database controller 22 to extract data from the source database 20. The transformation engine 26 may transform the extracted data into a common format and file structure. In transforming the data, the transformation engine 26 translates the data. The transformation engine 26 also augments translation with supplemental processing to modify disparate file structures of the source databases 20 into structures that can be combined. Accordingly, data extracted from each source database 20 is transformed into the common format and file structure. As described in detail below, the common format and file structure allows data from disparate source databases 20 to be loaded into the common server 16.

The common format and file structure is preferably compatible with the common server 16. The common format and file structure is compatible with the common server 16 where it can be directly utilized by the common server 16. Thus, for example, the common format and file structure may be the format in which data is stored in the common server 16. It will be understood, however, that the common format and file structure may require further transformation, translation or manipulation to be compatible with the common server 16.

The database controller 22 may determine a status of the transformed data. In accordance with one embodiment, the status of the transformed data may be the number of rows of data that is transformed.

The source systems 14 may each include a network interface system (NIS) 28 in communication with a network 30. The network 30 may be a Local Area Network (LAN), a Wide Area Network (WAN) or a combination network. Data extracted and transformed by the database controller 22 may be transmitted by the network interface system 28 over the network 30 to the common server 16. The data may be received at the common server 16 by a network interface system (NIS) 29.

The common server 16 may comprise a common database 32 and a common database controller 34. In a particular embodiment, the common server 16 may be a PYRAMID Server. The common database 32 may include a number of tables 36, together with a collection of operations that facilitate searching, sorting, recombination and similar activities.

Figures 2, 3:
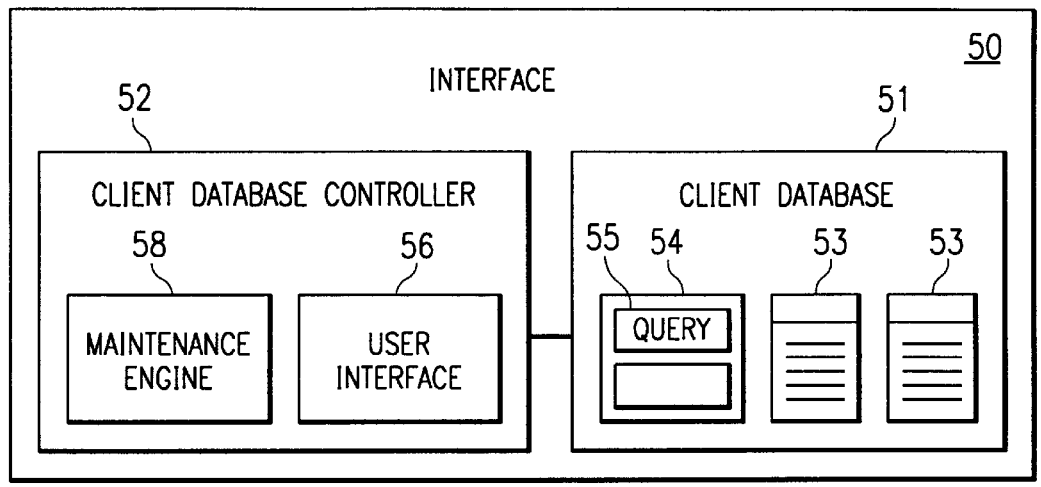
FIG. 2 illustrates a schematic block diagram of one embodiment of the interface of FIG. 1.
FIG. 3 illustrates a database table for use in connection with one embodiment of the common database of FIG. 1.

In a particular embodiment, the common database 32 may be a relational database, such as an ORACLE database. In this embodiment, the common database 32 may store information in tables 36 comprising rows 38 and columns 40 of data (FIG. 3). As described in detail below, each row 38 may represent a data record 41 while each column 40 may represent a field 42 of the data record 41. The common database 32 may conduct searches by using data in specified columns 40 of one table 36 to find additional data in another table 36.

In accordance with the one aspect of the present invention, each table 36 may include three columns 40 for each row 38. The columns may be any type of structure in which data of a particular type is stored, listed, referenced, accessed, or the like. In this embodiment, as best shown by FIG. 3, a first column 44 identifies the data record 41 of the row 38. In one embodiment, the first column 44 may include a data record ID. It should be understood, however, that the first column 44 may consist of any number of columns that uniquely identify the data record being categorized. The second column 45 lists a category name of the data record ID. A third column 46 lists a category value of the category name and data record ID combination. Thus, the table 36 includes a column that identifies the categories of the listed data record IDs. This category mapping conserves space and supports an unlimited number of category schemes without requiring the table 36 to be reconfigured.

By way of example, FIG. 3 illustrates exemplary table 36. Table 36 includes general ledger account codes "502361," "502362," "502363" and "502364." The general ledger account codes "502361" and "502364" may have a "Pur Grp" (purchasing group) category of "network." Thus, those general ledger account codes correspond to a network purchasing group. The general ledger account codes "502362" and "502363" may have a "Pur Grp" (purchasing group) category of "communications." Thus, those general ledger account codes correspond to a communications purchasing group As shown by FIG. 3, the general ledger account codes may be combined for global spend data for telecommunications by assigning each general ledger account code a "Gbl Spnd" (global spend) category for "telecommunications." Accordingly, category mapping allows data to be combined and/or split out based on category names. Continuing the example of FIG. 3, the general ledger account code "502361" may include a special category for "modems." Thus, a specialized data record may be created in the table 36 to focus on a very limited subset of the data. As described below, category mapping allows particular categories of data records in the common database 32 to be specified for a query of a report. Thus, a report may be tailored the meet the particular needs of the user. Additionally, category mapping conserves space and supports an unlimited number of category schemes. Users may add category names with which they are particularly interested to data records without requiring that the structure of the table 36 be reconfigured.

Returning to FIG. 1, the database controller 34 may manage requests for database action. The database controller 34 may also keep track of the physical details of file locations and formats, indexing schemes, and the like. Additionally, the database controller 34 provides centralized control of security and data integrity requirements.

The database controller 34 may include a load engine 48. The load engine 48 operates in conjunction with the database controller 34 to load data received from the source system 14 into the common database 32. As previously discussed, the data is received from the source systems 14 in a common format and file structure. Accordingly, data from a number of source systems 14 may be loaded, combined and otherwise manipulated in the common database 32. Thus, the common database 32 allows users to access, summarize and/or combine data that originated with the source systems 14 into data that is more meaningful to them.

The load engine 48 may also determine a status of the loaded data. In accordance with one embodiment, the status of the loaded data may be the number of rows of data that is loaded. The load engine 48 may validate the data received from the source systems 14 by comparing the status of the loaded data to the status of the transformed data. As previously discussed, the status of the transformed data may be the number of rows of data that is transformed.

The common server 16 may be accessed by the client systems 18. The client systems 18 may be remote to the common server 16. In such a case, the client systems may include a network interface system (NIS) 49 in communication with the network 30.

Each client system 18 may include an interface 50 for accessing the common database 32 of the common server 16. As best shown by FIG. 2, the interface 50 may include a client database 51 and a client database controller 52. The client database 51 may include a number of tables 53 and reports 54. Each report 54 may be based on one or more queries 55 of the common database 32 along with information directing the manner in which the data obtained from the queries should be displayed to a user.

The client database controller 52 may manage requests for client database action. The database controller 52 may also keep track of the physical details of file locations and formats, indexing schemes, and the like. Additionally, the database controller 52 provides centralized control of security and data integrity requirements.

The client database controller 52 may also execute the queries 55 of the reports 54. The client database controller 52 may execute the queries 55 by transmitting them over the network 30 to the common database controller 34. The common database controller 34 may then directly query the common database 32. The common database controller 34 may receive data from the common database 32 in response to the query. These results may be transmitted by the common database controller 34 over the network 30 to the client database controller 52. The results may be stored in tables 53 of the client database 51, displayed to the user, or both. When displayed to the user, the results of a report may be configured in accordance with the display information of the report.

The client database controller 52 may include a user interface 56 and a maintenance engine 58. In a particular embodiment, the user interface 56 may be implemented in whole or part by MICROSOFT ACCESS. The user interface 56 may receive user requests for reports 54. The user interface 56 may allow particular categories of data records in the common database 32 to be specified for a report. Thus, a report may be tailored the meet the particular needs of the user. In response to a user request, the user interface 56 may initiate execution of the queries 55 of the report 54 by the client database controller 52.

The maintenance engine 58 may also initiate execution of the queries 55 of a report 54. The maintenance engine 58 may initiate execution of a report 54 during off-prime hours. For example, the maintenance engine 58 may initiate reports 54 during evening or weekend hours. The maintenance engine 58 may also initiate reports 54 periodically according to a schedule. For example, a particular report 54 may be initiated daily while another type of report is initiated at the end of each week.

In one embodiment, the maintenance engine 58 initiates reports that include extended or popular queries. An extended report may include summary data that is resource intensive to accumulate. A popular report may be used by a large number of users. Results of extended queries may be stored in table 53 of the client database 51. Results of reports 54 initiated by the maintenance engine 58 may be stored in the client database 51 for later use. Accordingly, a user may later access the results of the reports or queries from the interface 50 without having to communicate with the common server 16 over the network 30.

The maintenance engine 58 may also transmit results of reports 54 that it initiated over the network 30 to other client systems 18. Accordingly, client systems 18 that use a same report 54 need not each execute the report 54. Rather, the report 54 is executed once by a client system 18 and then shared with other client systems 18.

It is well known in the art of computer programming that an engine is a collection of subroutines and data structures and performs a particular task or function. Thus, it will be understood that the extraction engine 24, transformation engine 26, load engine 48 and maintenance engine 58 have been separately identified and discussed for the convenience of the reader, and that the functions performed by any of the engines could be performed by another or different engine, or another part of the distributed database system 12. Thus, for example, the transformation engine 26 may be stored in the common database controller 34. In such an embodiment, data from the source systems 14 may be transmitted in disparate formats and file structures to the common server 16 and there transformed into a common format and file structure.

Figure 4:
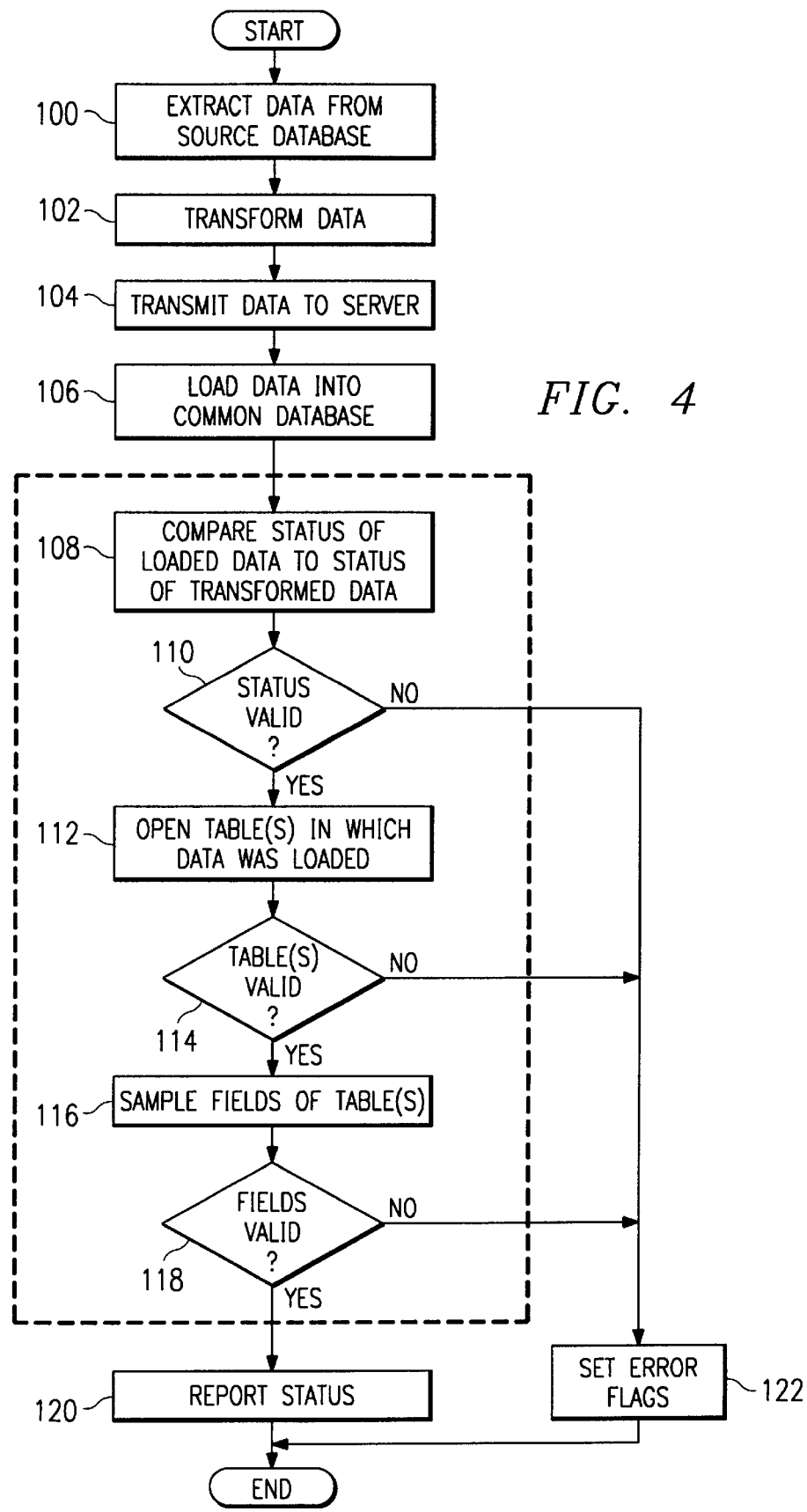
FIG. 4 is a flow chart of a method for extracting, receiving and loading data into the common database of FIG. 1.

The methods of the present invention will now be described. FIG. 4 is a flow chart of a method of extracting, receiving and loading data into the common database 32. The method begins at step 100 wherein data is extracted from the source database 20. The data may be extracted by the extraction engine 24. As previously discussed, the source databases 20 of the source systems 14 may store data in disparate formats and file structures. Accordingly, at step 102, the extracted data is transformed into a common format and file structure. The common format and file structure is preferably compatible with the common server 16 such that it can be directly utilized by the common server 16.

Proceeding to step 104, the transformed data is transmitted to the common server 16. In the embodiment of FIG. 1, where the source systems 14 and common server 16 are remote, the data may be transmitted over the network 30. As previously discussed, the network 30 may be a Local Area Network (LAN), a Wide Area Network (WAN) or a combined network. The data may be received at the common server 16 by the common database controller 34.

Next, step 106, the load engine 48 of the common server 16 loads the data received by the common database controller 34 into the common database 32. The data may be loaded into the tables 36 of the common database 32. As previously discussed, the common database 32 may employ category mapping to conserve space in the database 32 and to support an unlimited number of category schemes without requiring the tables 36 to be modified or altered.

Steps 108–118 validate the data loaded into the common database 32. At step 108, the load engine 48 may compare the status of the loaded data to the status of the transformed data. As previously discussed, the status of the transformed data may be the number of rows of data that is transformed. Similarly, the status of the loaded data may be the number of rows of data that is loaded.

Proceeding to decisional step 110, the load engine 48 determines whether the status of the loaded data is valid. In one embodiment, the status of the loaded data is valid if the number of rows of loaded data is equal to the number of rows of transformed data. If the status of the loaded data is valid, the YES branch of decisional step 110 leads to step 112.

At step 112, the load engine 48 may open the tables 36 of the common database 32 into which the data was loaded. Next, at decisional step 114 the load engine 48 determines if the tables 36 are valid. In one embodiment, the tables 36 may be valid if they can be successfully opened. If the tables are valid, the YES branch of decisional step 114 leads to step 116.

At step 116, the load engine 48 may sample one or more fields of the tables 36 to determine if the fields are valid. Next, at decisional step 118, load engine 48 determines whether the fields are valid. In accordance with one embodiment, the fields are valid where they contain the expected type of data. If the fields are valid, the YES branch of decisional step 118 leads to step 120.

At step 120 the load engine 48 reports the status of the loaded data. The status of the loaded data may be reported to an administrator of the common server 16 and of each of the client systems 18.

Returning to decisional step 110, if the status of the data is not valid, the NO branch of decisional step 110 leads to step 122. The NO branches of decisional steps 114 and 118 also lead to step 122. At step 122, the load engine 48 sets an error flag. Thus, a system administrator may be notified of any errors in the loaded data. Preferably, invalid data is automatically removed from the common database 32 by the load engine 48. However, the invalid data may be retained in the common database 32 for review, correction, and/or removal by a system administrator. After the error condition has been corrected, the system administrator may restart the process at step 100.

Figure 5:
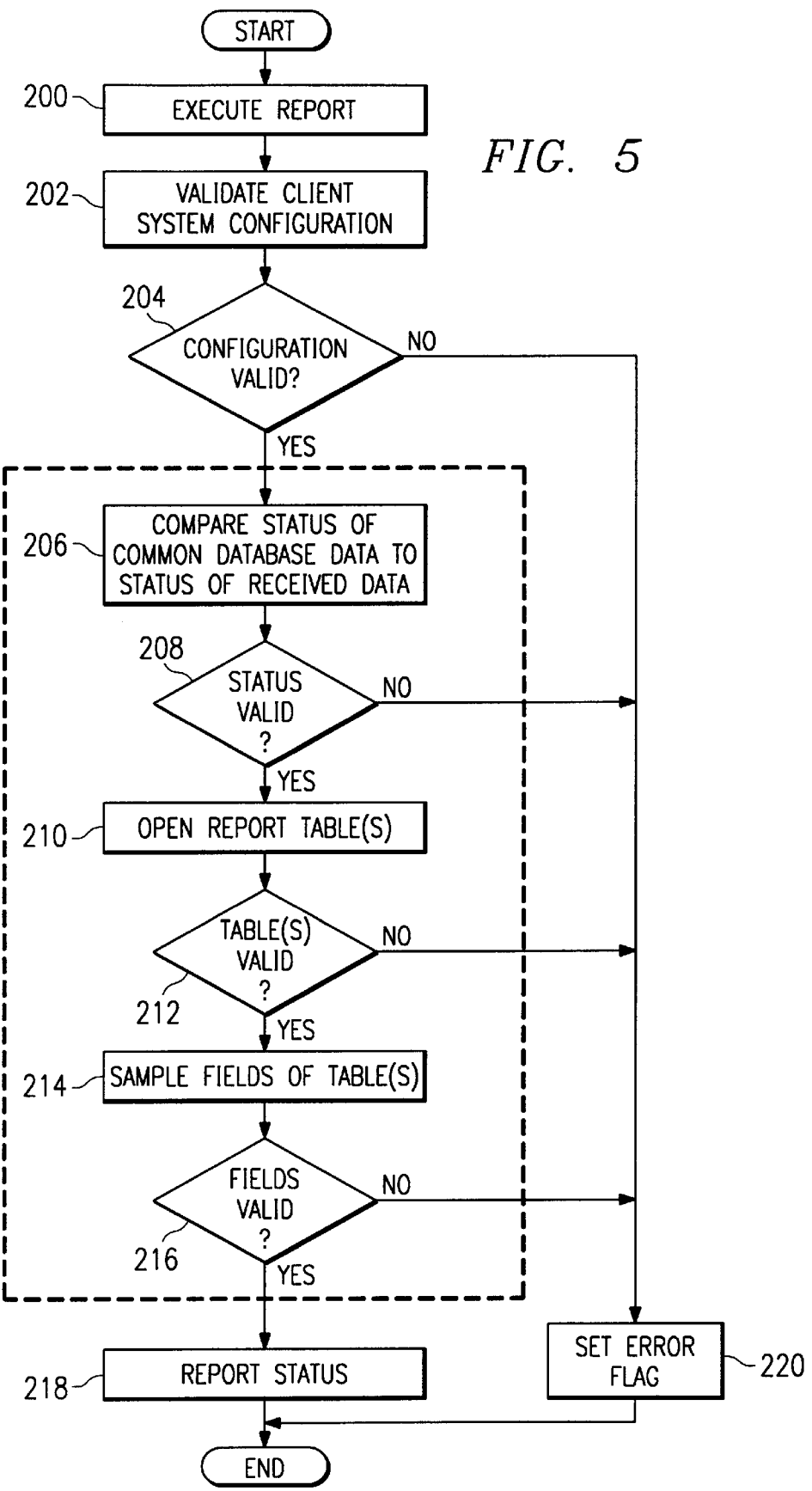
FIG. 5 is a flow chart of a method for executing queries of the common database of FIG. 1.

FIG. 5 is flow chart of a process for executing queries of the common database 32. The process begins at step 200 in which a report 54 is executed by the client system 18. As previously described, the report 54 includes at least one query of the common database 32. Execution of the report 54 may be initiated by the user interface 56 or the maintenance engine 58 of the client database controller 52. The client database controller 52 may execute the report 54 by transmitting queries 55 of the report 54 to the common database controller 34. The common database controller 34 may execute the queries of the common database 32 and passes the results back to the client database controller 52. The results may be stored in the tables 53 of the client database 51.

At step 202, the client database controller 52 may validate the configuration of the client system 18. Step 202 leads to decisional step 204. In accordance with one embodiment, the configuration of the client system 18 may be valid if it includes the current version and table layout of the common database 32. If the configuration of the client system 18 is valid, the YES branch of decisional step 204 leads to step 206.

Steps 206–216 validate the data received in response to the query of the common database 32. At step 206, the client database controller 52 may compare the status of the data received to the status of that data in the common database 32. The status of the data in the common database 32 may be the number of rows of the data in the common database 32. Similarly, the status of the data received may be the number of rows of data that is received.

Proceeding to decisional step 208, the client database controller 52 determines whether the status of the data received is valid. In one embodiment, the status of the data received is valid if the number of rows of data received is equal to the number of rows of that data in the common database 32. If the status of the data received is valid, the YES branch of decisional step 208 leads to step 210.

At step 210, the client database controller 52 may open the tables 53 of the client database 51 into which the data received was loaded. Next, at decisional step 212 the client database controller 52 determines if the tables 53 are valid. In one embodiment, the tables 53 may be valid if they can be successfully opened. If the tables are valid, the YES branch of decisional step 212 leads to step 214.

At step 214, the client database controller 52 may sample one or more fields of the tables 53 to determine if the fields are valid. Next, at decisional step 216, the client database controller 52 determines whether the fields are valid. In accordance with one embodiment, the fields are valid where they contain the expected type of data. If the fields are valid, the YES branch of decisional step 216 leads to step 218.

At step 218 the client database controller 52 reports the status of the data received. The status of the received data may be reported to an administrator of the client system 18.

Returning to decisional step 204, if the configuration is not valid, the NO branch of decisional step 204 leads to step 220. The NO branches of decisional steps 208, 212 and 216 also lead to step 220. At step 220, the client database controller 52 sets an error flag. Thus, a system administrator may be notified of any errors in the received data. Preferably, invalid data is automatically removed from the client database 51 by the client database controller 52. However, the invalid data may be retained in the client database 51 for review, correction, and/or removal by the system administrator. After the error condition has been corrected, the system administrator may restart the process at step 200.

Although the present invention and its advantages have been described in detail, it should be understood that various changes, substitutions and alterations can be made therein without departing from the spirit and scope of the invention as defined by the appended claims.

What is claimed is:

1. A distributed data storage system, comprising:
   a plurality of source systems, each including:
   a source database, at least two of the source systems having source databases operable to store data in disparate formats and file structures;
   an extraction engine operable to extract data from the source database; and
   a transformation engine operable to transform data extracted from the source database into a common format and a common file structure; and
   a common database server including:
   a common database;
   a common database controller operable to receive data transformed by the transformation engine; and
   a load engine operable to load the data received by the common database controller into the common database.

2. The distributed data storage system of claim 1, wherein the common database server is remote from the source systems.

3. The distributed data storage system of claim 1, wherein the load engine is further operable to validate the data received by the common database controller.

4. The distributed data storage system of claim 1, further comprising at least one client system, the client system including an interface operable to execute a query of the common database.

5. The distributed data storage system of claim 4, wherein the client system is remote from the common database server.

6. The distributed data storage system of claim 4, wherein the interface is further operable to receive data in response to the query of the common database.

7. The distributed data storage system of claim 6, wherein the interface is further operable to validate the data received in response to the query of the common database.

8. The distributed data storage system of claim 4, further comprising a client database operable to store the data received in response to the query of the common database.

9. The distributed data storage system of claim 4, the interface further comprising a maintenance engine operable to initiate execution of the query of the common database by the interface.

10. The distributed data storage system of claim 9, wherein the query is an extended query.

11. The distributed data storage system of claim 9, wherein the query is a popular query.

12. The distributed data storage system of claim 9, wherein the maintenance engine is further operable to initiate execution of the query periodically according to a schedule.

13. The distributed data storage system of claim 4, the interface further comprising a user interface operable to initiate execution of the query of the common database by the interface in response to a user request.

14. A method of storing data from a plurality of source databases, comprising the steps of:
   extracting data from a first source database;
   transforming the data of the first source database into a common format and a common file structure;
   loading the transformed data of the first source database into a common database;
   extracting data from a second source database, the first and second source databases storing data in disparate formats;
   transforming the data of the second source database into the common format and the common file structure; and
   loading the transformed data of the second source database into the common database.

15. The method of storing data of claim 14, further comprising the step of validating the loaded data of each source database.

16. The method of storing data of claim 15, wherein the step of validating the loaded data of one of the source databases comprises the steps of:
   determining a status of the transformed data of the source database;
   determining a status of the loaded data of the source database;
   comparing the status of the transformed data to the status of the loaded data; and
   setting an error flag if the status of the transformed data differs from the status of the loaded data.

17. The method of storing data of claim 16, wherein the transformed data of the source database is loaded into at least one table of the common database, the table including at least one field, further comprising the steps of:
   determining if the table into which the transformed data of the source database was loaded is valid;
   setting an error flag if the table is invalid;
   determining if the field of the table is valid; and
   setting an error flag if the field is invalid.

18. The method of storing data of claim 14, wherein storing data in the common database comprises the steps of:
   storing in a first column of a data record an identifier uniquely identifying a subject of the data record;
   storing in a second column a category name for the data record; and
   storing in a third column a category value associated with the category name in the second column.

19. A method of storing data in a database table comprising the steps of:
   storing in a first column of a data record an identifier uniquely identifying a subject of the data record;
   storing in a second column a category name for the data record; and
   storing in a third column a category value associated with the category name in the second column;
   wherein modifying the table to include a new category for the subject of the data record comprises the steps of:
      adding to the table a second data record for the subject;
      storing in the first column of the second data record, the identifier uniquely identifying the subject of the second data record;
      storing in the second column of the second data record, a name of the new category; and
      storing in the third column of the second data record, a category value associated with the new category name in the second column of the second data record.

* * * * *